(No Model.)
E. F. BRIGGS.
GLOBE OR OTHER VALVE.
No. 372,200. Patented Oct. 25, 1887.
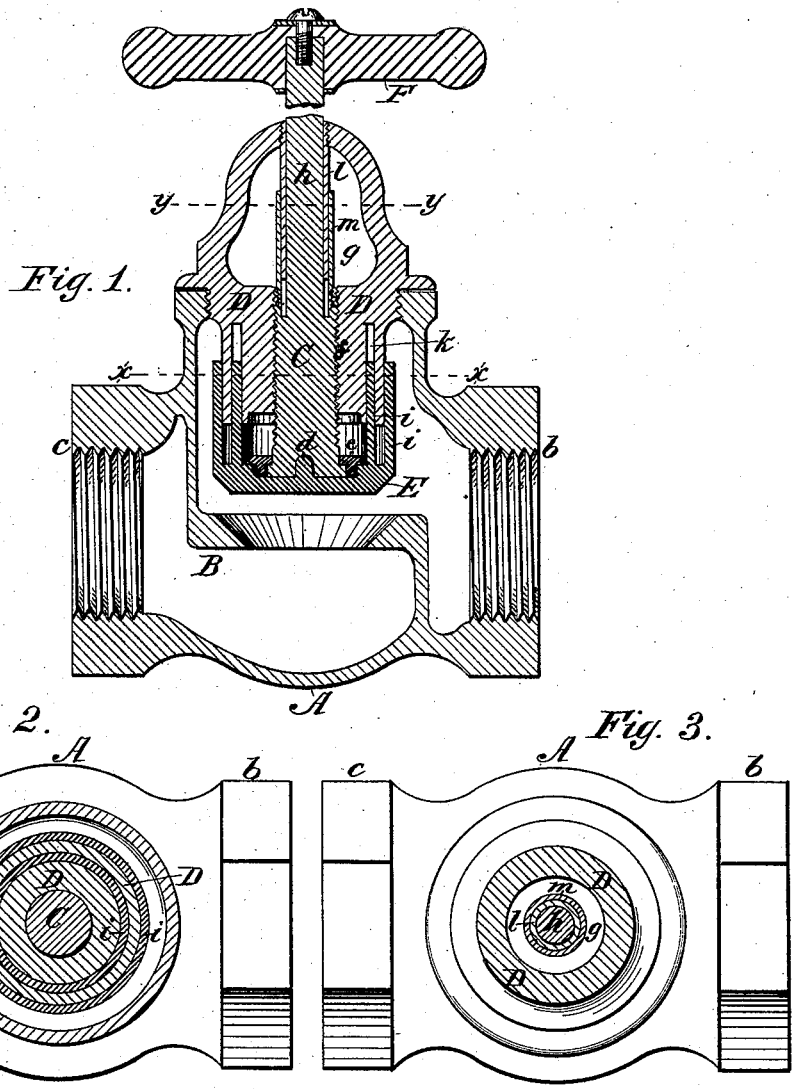
WITNESSES:
Chas. F. Lurcott
C. Sedgwick
INVENTOR:
E. F. Briggs
BY Munn & Co.
ATTORNEYS.

UNITED STATES PATENT OFFICE.

EDWIN F. BRIGGS, OF BROOKLYN, NEW YORK, ASSIGNOR OF ONE-HALF TO BENJAMIN ALBERTSON, OF ASBURY PARK, NEW JERSEY.

GLOBE OR OTHER VALVE.

SPECIFICATION forming part of Letters Patent No. 372,200, dated October 25, 1887.

Application filed May 17, 1887. Serial No. 238,476. (No model.)

*To all whom it may concern:*

Be it known that I, EDWIN F. BRIGGS, of Brooklyn, in the county of Kings and State of New York, have invented a new and useful Improvement in Globe and other Valves, of which the following is a full, clear, and exact description.

This invention relates to valves of various kinds, including globe valves and faucets, for the control of different fluids, gases, or vapors, in which there is used a screw-threaded spindle working through a suitable screw-threaded box, boss, or cap-like portion of the valvular device or structure, and fitted on its inner end with a disk or valve proper for opening and closing an aperture in the valve-seat. Ordinarily in such valvular devices it is customary to provide the screw spindle or stem beyond its threaded portion with a stuffing-box to prevent the passage of fluid or vapor round or past said spindle or stem to the atmosphere, and the keeping of these stuffing-boxes in order or properly packed is not only laborious and expensive, but very troublesome and unreliable.

My invention has for its object the dispensing with a stuffing-box in valvular structures of the description above named, and at the same time providing against objectionable leakage round or past the spindle or stem, or so subduing the leakage, if any, that the escaping fluid or vapor will be relieved of force or pressure and be tired out or spent before it reaches an outlet; and the invention consists in a novel construction and combination of parts, substantially as hereinafter described, and pointed out in the claims, whereby the desired result is very perfectly attained.

Reference is to be had to the accompanying drawings, forming a part of this specification, in which similar letters of reference indicate corresponding parts in all the figures.

Figure 1 represents a longitudinal section of a globe or coupling valve having my invention applied. Fig. 2 is a transverse section of the same upon the line $x\ x$ in Fig. 1, and Fig. 3 is a transverse section thereof upon the line $y\ y$ in Fig. 1.

A is the globe portion or case of the valve, having a dividing apertured valve-seat, B, within it and provided with inlet and outlet coupling ends or necks $b\ c$, as usual.

C is the screw-threaded spindle or stem, and D the screw-threaded box, boss, or cap-like portion of the device, within and through which the spindle or stem C works for the purpose of opening or closing the passage through the valve-seat B by means of a valve proper or valvular disk, E, carried on the inner end of the spindle C, and which, after being centered, as by a projection, $d$, entering a correspondingly-shaped recess in the inner end of the spindle, is secured to the spindle by a collared nut, $e$, constructed to lap over a collar upon the inner end of the spindle and screwing into the disk. The valvular disk E, however, may be otherwise secured to the spindle.

F is the wheel or handle by which the spindle C is rotated to screw it in or out.

Only the inner portion of the box D, which forms a stationary projection within the valve-case, and inner portion of the spindle C is screw-threaded, as at $f$, and the outer portion of the box or cap D has an enlarged interior cavity or chamber, $g$, within and out through which and through an aperture in its outer end the outer smooth or cylindrical portion, $h$, of the spindle C is free to work.

The back of the valvular disk E is provided with a series of elongated annular flanges, $i\ i'$, at right angles to the face of the disk. There may be any number of these annular flanges concentrically arranged one within the other, and the same are constructed to snugly fit in a turning and sliding manner the lower portion of the screw cap or box D, after the fashion of a close sleeve or sleeves, the inner annular flange, $i$, here shown fitting snugly but freely a correspondingly shaped and sized annular recess, $k$, in the lower portion of the screw cap or box D outside of the spindle C, and the outer annular flange, $i'$, shown fitting snugly but freely around the cylindrical exterior of said box, boss, or cap D. In some cases there may be only one of these annular flanges in sleeve-like fit with the box or cap D; but I usually prefer at least two. The object of them and of their fit, as described, over or within the inner end portion of the box D is not only to give an extended joint-surface, but to divert in a tortuous manner any steam or other vapor, gas, or fluid controlled by the valve in its endeavor to escape past or along the screw-spindle C, and to so break the force and "tire" any such escaping vapor or fluid that whatever little does or may escape past the spindle will be so thinned or reduced as to be of but little account.

To still more perfectly secure the same result, I also provide the outer end portion of the box D with an elongated inwardly-projecting sleeve, $l$, through which the cylindrical portion $h$ of the spindle C is free to pass in a close manner, and further provide the spindle with an outer sleeve, $m$, adapted to closely fit, turn upon, and slide over or along the fixed sleeve $l$, as shown in Fig. 1 of the drawings. In this way or by these means the valve may be kept almost perfectly if not wholly free from outside leakage without the aid of a stuffing-box; nor is it absolutely necessary that the sleeves $l$ and $m$ should be used.

Having thus fully described my invention, what I claim as new, and desire to secure by Letters Patent, is—

1. In valves operated by a screw-spindle capable of operation from the exterior, the combination, with a stationary projection within the valve-case in and through which the spindle works, of a valvular disk or valve proper secured on the inner end of said spindle and provided with an elongated annular flange or sleeve on its back in axial relation with the valve exterior to the spindle and adapted to snugly fit or engage in a turning and sliding manner the stationary projection within the valve-case, substantially as and for the purposes specified.

2. The combination of the screw-spindle C, the valvular disk E, secured on the inner end of said spindle, provided on its back with an elongated annular flange, $i$, parallel with and exterior to said spindle, and the screw box or cap C, within and through which the spindle works, provided with an annular recess, $k$, adapted to snugly receive said annular flange within it, essentially as described.

3. The combination, with the valve-case, of the internally-screw-threaded box or cap D, having an elongated annular recess, $k$, in its inner end, the screw-threaded spindle C, and the valvular disk E, provided on its back with elongated annular flanges $i\ i'$, adapted to fit within said annular recess in the box or cap and to surround or inclose the inner end portion of the box or cap, substantially as shown and described.

EDWIN F. BRIGGS.

Witnesses:
A. GREGORY,
C. SEDGWICK.